(12) United States Patent
Lee et al.

(10) Patent No.: US 11,787,718 B2
(45) Date of Patent: Oct. 17, 2023

(54) ZERO-LIQUID DISCHARGE (ZLD) WASTEWATER TREATMENT APPARATUS AND METHOD

(71) Applicant: DOOSAN ENERBILITY CO., LTD., Changwon (KR)

(72) Inventors: Gun Myung Lee, Changwon (KR); Wee Kwan Kang, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 147 days.

(21) Appl. No.: 17/242,325

(22) Filed: Apr. 28, 2021

(65) Prior Publication Data

US 2021/0331960 A1   Oct. 28, 2021

(30) Foreign Application Priority Data

Apr. 28, 2020   (KR) .......................... 10-2020-0051518

(51) Int. Cl.
*C02F 9/00*   (2023.01)
*B01D 9/00*   (2006.01)
(Continued)

(52) U.S. Cl.
CPC ................ *C02F 9/00* (2013.01); *B01D 5/006* (2013.01); *B01D 5/0009* (2013.01); *B01D 9/0013* (2013.01); *B01D 9/0022* (2013.01); *B01D 9/0059* (2013.01); B01D 2009/0086 (2013.01); *C02F 1/048* (2013.01); *C02F 1/06* (2013.01); *C02F 1/52* (2013.01); *C02F 11/127* (2013.01);
(Continued)

(58) Field of Classification Search
CPC ........................................................ C02F 9/00
See application file for complete search history.

(56) References Cited

U.S. PATENT DOCUMENTS

2019/0330938 A1* 10/2019 Askelsen ................ C02F 1/008

FOREIGN PATENT DOCUMENTS

| CN | 106966535 A | 7/2017 |
|---|---|---|
| CN | 109422402 A | 3/2019 |

(Continued)

OTHER PUBLICATIONS

Machine translation for CN 106966535 in IDS.*
(Continued)

*Primary Examiner* — Peter Keyworth
(74) *Attorney, Agent, or Firm* — Harvest IP Law, LLP

(57) ABSTRACT

A zero-liquid discharge (ZLD) wastewater treatment apparatus is provided. The ZLD wastewater treatment apparatus includes a concentrator configured to concentrate wastewater to produce a primary concentrate, an evaporation crystallizer configured to concentrate and crystallize the primary concentrate to produce a secondary concentrate, a cooling crystallizer configured to cool the secondary concentrate to generate crystals from the secondary concentrate, a dehydrator configured to separate the product produced by the cooling crystallizer into a solid component and a liquid component, and a cooling system configured to cool the secondary concentrate introduced into the cooling crystallizer, wherein the liquid component produced by the dehydrator heat exchanges with a cooling medium in the cooling system and returns to the evaporation crystallizer.

9 Claims, 5 Drawing Sheets

(51) Int. Cl.
*B01D 5/00* (2006.01)
*C02F 1/52* (2023.01)
*C02F 1/04* (2023.01)
*C02F 1/06* (2023.01)
*C02F 11/127* (2019.01)

(52) U.S. Cl.
CPC ............... *C02F 2001/5218* (2013.01); *C02F 2301/063* (2013.01)

(56) References Cited

FOREIGN PATENT DOCUMENTS

| | | |
|---|---|---|
| JP | 2001009244 A | 1/2001 |
| JP | 2011020074 A | 2/2011 |
| KR | 101640127 B1 | 7/2016 |
| KR | 101782407 B1 | 9/2017 |
| KR | 102003428 B1 | 7/2019 |

OTHER PUBLICATIONS

Machine translation for CN 109422402 in IDS.*
https://www.swtc.edu/Ag_Power/air_conditioning/lecture/basic_cycle.htm, 2006.*

* cited by examiner

ZERO-LIQUID DISCHARGE (ZLD) WASTEWATER TREATMENT APPARATUS AND METHOD

CROSS REFERENCE TO RELATED APPLICATION

This application claims priority to Korean Patent Application No. 10-2020-0051518, filed on Apr. 28, 2020, the disclosure of which is incorporated herein by reference in its entirety.

BACKGROUND

1. Field

Apparatuses and methods consistent with exemplary embodiments relate to a zero-liquid discharge (ZLD) wastewater treatment technology and, more particularly, to a ZLD wastewater treatment apparatus and method in which ions dissolved in wastewater are precipitated as crystals through evaporation concentration and crystallization processes, and only the precipitated crystals are separated from the concentrate.

2. Description of the Related Art

Evaporation crystallization and cooling crystallization have been used to reliably treat wastewater discharged from pollutant sources such as nuclear power plants or thermal power plants. In recent years, there have been attempts to combine those technologies to complement the disadvantages of each technology.

The wastewater treatment methods precipitate highly concentrated ions dissolved in wastewater as crystals using physicochemical properties that change according to temperature through an evaporation concentration process, and recover and recycle the water evaporated through the evaporation process.

FIG. 1 is a schematic diagram illustrating a system configuration of a related art ZLD wastewater treatment apparatus.

Referring to FIG. 1, wastewater is pretreated by a pretreatment apparatus 11, a produced pretreatment wastewater is primarily concentrated by a concentrator 10, and a produced primary concentrate c1 is secondarily concentrated by an evaporation crystallizer 20. The secondary concentrate c2 produced by the evaporation crystallizer 20 is cooled by a cooling crystallizer 30 so that crystals "s" are generated. As a result, the crystals "s" and filtrate "f" are present together.

The crystals "s" and the filtrate "f" generated by the cooling crystallizer 30 are separated by a dehydrator 40, and the separated filtrate "f" is returned for recovery to the evaporation crystallizer 20. For example, the filtrate "f" discharged from the dehydrator 40 is supplied to a cooler 60 through a filtration tank 41, and the filtrate "f" exchanges heat with the secondary concentrate c2 flowing into the cooling crystallizer 30.

In order to cool the secondary concentrate c2 supplied to the cooling crystallizer 30, the ZLD wastewater treatment apparatus 1 includes a cooling system 50 for compressing, condensing, expanding, and evaporating a cooling medium "r". To this end, the cooling system 50 includes a compressor 51, a condenser 52, an expansion valve 53, and an evaporator 54.

The ZLD wastewater treatment apparatus 1 further requires a cooling tower 55 for supplying cooling water cw used to condense the cooling medium "r" or requires an air cooler instead of the cooling tower 55. This increases capital expenditures and operating expenses.

The cooler 60 is additionally required for heat exchange between the filtrate "f" and the secondary concentrate c2. The cooler 60 is usually implemented as a shell-and-tube heat exchanger. However, in the shell-and-tube heat exchanger, the shell side has a structural vulnerability in that scale is easily generated due to the high concentration filtrate "f" and the high concentration concentrate c2. For this reason, there is a problem that the heat exchange efficiency is rapidly deteriorated.

SUMMARY

Aspects of one or more exemplary embodiments provide a ZLD wastewater treatment apparatus and method capable of reducing a capital expenditure and an operating cost by modifying existing wastewater treatment system.

Additional aspects will be apparent in part in the description which follows and, in part, will become apparent from the description from the following description, or may be learned by practice of the exemplary embodiments.

According to an aspect of an exemplary embodiment, there is provided a zero-liquid discharge (ZLD) wastewater treatment apparatus including: a concentrator configured to concentrate wastewater to produce a primary concentrate; an evaporation crystallizer configured to concentrate and crystallize the primary concentrate to produce a secondary concentrate; a cooling crystallizer configured to cool the secondary concentrate to generate crystals from the secondary concentrate; a dehydrator configured to separate the product produced by the cooling crystallizer into a solid component and a liquid component; and a cooling system configured to cool the secondary concentrate introduced into the cooling crystallizer. The liquid component discharged from the dehydrator heat exchanges with a cooling medium in the cooling system and returns to the evaporation crystallizer.

The cooling system may include a compressor configured to compress the cooling medium, a condenser configured to condense the compressed cooling medium produced by the compressor, an expansion valve configured to expand the condensed cooling medium, and an evaporator configured to evaporate the cooling medium passing through the expansion valve to cool surrounding air, and the liquid component produced by the dehydrator may be supplied to the condenser to condense the cooling medium.

The condenser may be a shell-and-tube heat exchanger, and the liquid component produced by the dehydrator may flow to a tube and the cooling medium may flow to a shell so that the liquid component and the cooling medium perform heat exchange with each other.

The primary concentrate produced by the concentrator may have a concentration of 120,000 to 160,000 mg/L.

The secondary concentrate produced by the evaporation crystallizer may have a concentration of 300,000 to 400,000 mg/L.

The primary concentrate introduced into the evaporation crystallizer may be concentrated through a vacuum concentration at a temperature of 65 to 75° C. and a pressure of 0.2 to 0.3 barg.

The secondary concentrate introduced into the cooling crystallizer may be cooled to a temperature range of −10 to 7° C.

The dehydrator may be a basket-type centrifuge or decanter-type centrifuge.

According to an aspect of another exemplary embodiment, there is provided a ZLD wastewater treatment apparatus including: a concentrator configured to concentrate wastewater to produce a primary concentrate; an evaporation crystallizer configured to concentrate and crystallize the primary concentrate to produce a secondary concentrate; a cooling crystallizer configured to cool and crystallize the secondary concentrate; a dehydrator configured to separate the product produced by the cooling crystallizer into a solid component and a liquid component; a cooling system configured to cool the secondary concentrate introduced into the cooling crystallizer; and a pretreatment device configured to pretreat the wastewater supplied to the concentrator. The liquid component discharged from the dehydrator heat exchanges with a cooling medium in the cooling system and returns to the evaporation crystallizer.

According to an aspect of another exemplary embodiment, there is provided a ZLD wastewater treatment method including: concentrating wastewater to produce a primary concentrate; evaporating crystallization by evaporating the primary concentrate for concentration and crystallization of the primary concentrate to produce a secondary concentrate; cooling crystallization by cooling, by a cooling system, the secondary concentrate to generate crystals; dehydrating by separating the product produced by the cooling crystallization into a solid component and a liquid component; and recovering the liquid component produced through the dehydrating and returning the liquid component to the evaporating crystallization, wherein the liquid component produced by the dehydrating heat exchanges with a cooling medium in the cooling system and returns to the evaporating crystallization.

The method may further include pretreating the wastewater prior to the concentrating.

In the pretreating, suspended solids contained in the wastewater may be removed through physicochemical actions including coagulation and precipitation, and highly soluble ions, that are difficult to precipitate through evaporation, may be removed through a softening process.

The primary concentrate produced through the concentrating may have a concentration of 120,000 to 160,000 mg/L.

The secondary concentrate produced through the evaporating crystallization may have a concentration of 300,000 to 400,000 mg/L.

The primary concentrate introduced into the evaporating crystallization may be concentrated through a vacuum concentration at a temperature of 65 to 75° C. and a pressure of 0.2 to 0.3 barg.

The secondary concentrate introduced into the cooling crystallization may be cooled to a temperature range of −10 to 7° C.

A basket-type centrifuge or decanter-type centrifuge may be used in the dehydrating.

The ZLD wastewater treatment apparatus and method according to one or more exemplary embodiments can reduce the overall energy consumption and simplify the overall system configuration by condensing a cooling medium of a cooling system with low-temperature filtrate.

In addition, because a cooling tower is not included in the ZLD wastewater treatment apparatus and method according to one or more exemplary embodiments, it is possible to reduce the influence of the temperature of external air on the system efficiency, thereby minimizing heat waste. Furthermore, it is possible to reduce capital expenditures (CAPEX) and operating expenses (OPEX) through the simplification of the system and process configuration.

In addition, if a shell-and-tube heat exchanger is used to condense a cooling medium, high concentration filtrate flows toward the tube side and the cooling medium flows toward the shell side. Therefore, it is possible to solve the problem that scale is easily generated due to the filtrate flowing toward the shell side in the related art.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
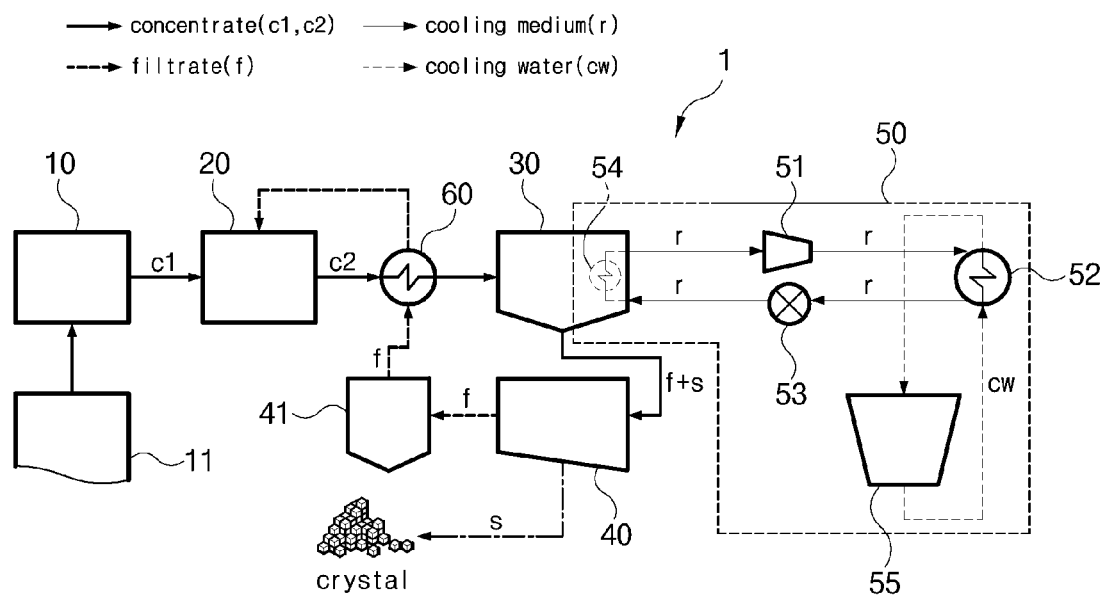
FIG. 1 is a system configuration diagram schematically illustrating a related art ZLD wastewater treatment apparatus.

Various modifications and various embodiments will be described below in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Hereinafter, a ZLD (zero-liquid discharge) wastewater treatment apparatus according to an exemplary embodiment will be described with reference to the accompanying drawings.

Figure 2:
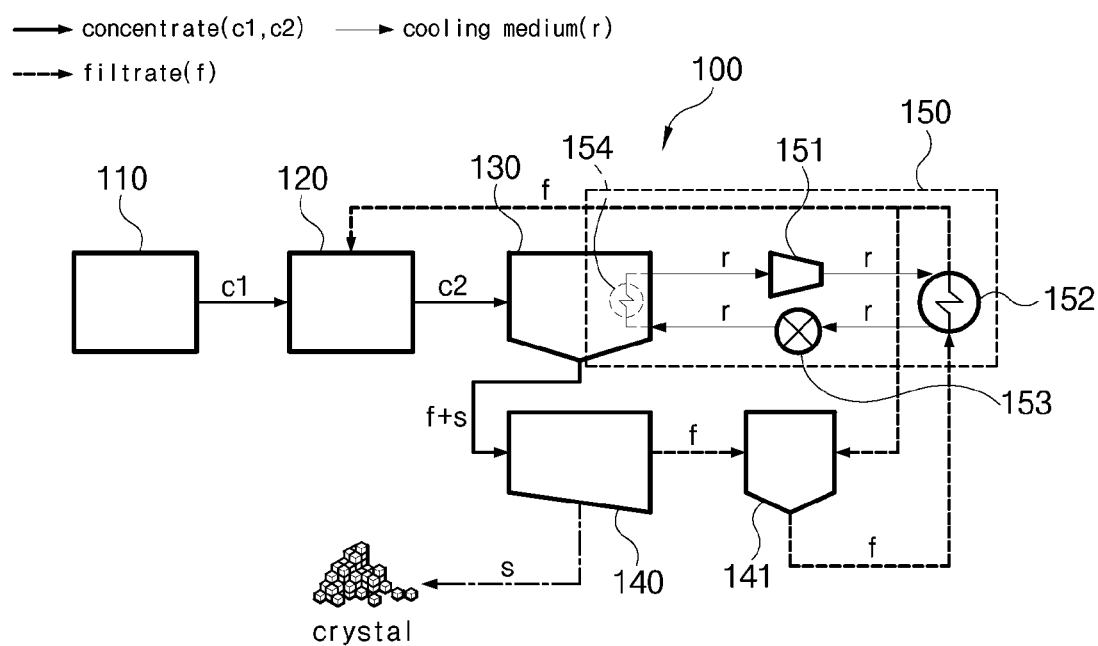
FIG. 2 is a configuration diagram schematically illustrating a ZLD wastewater treatment apparatus according to an exemplary embodiment.

FIG. 2 is a system configuration diagram schematically illustrating a ZLD wastewater treatment apparatus according to an exemplary embodiment.

Referring to FIG. 2, a ZLD wastewater treatment apparatus 100 includes a concentrator 110, an evaporation crystallizer 120, a cooling crystallizer 130, a dehydrator 140, and a cooling system 150.

The concentrator 110 concentrates wastewater to produce primary concentrate c1 having a concentration of 120,000 to 160,000 mg/L (i.e., about 12 to 16 wt %). The concentrator 110 may be a vertical tube falling film evaporator that concentrates wastewater through evaporation, but the type of the concentrator 110 is not limited thereto.

The evaporation crystallizer 120 evaporates the primary concentrate c1 supplied from the concentrator 110 to produce secondary concentrate c2 that is more concentrated than the primary concentrate c1. The evaporation crystallizer 120 may be a forced circulation evaporator. Here, the primary concentrate c1 having a concentration of 300,000 to 400,000 mg/L (i.e., about 23 to 32 wt %) is introduced into the evaporation crystallizer 120, and the secondary concentrate c2 is produced by the evaporation crystallizer 120.

In this case, a thermal vapor recompressor (TVR) or a mechanical vapor recompressor (MVR) may be used as a driving heat source of a forced circulation evaporator. However, it is understood that the type of the driving heat source of the forced circulation evaporator is not limited thereto.

The evaporation crystallizer 120 is operated at a temperature of 65 to 75° C. and at a pressure of 0.2 to 0.3 barg for the efficiency of the cooling crystallizer 130.

The cooling crystallizer 130 cools the introduced secondary concentrate c2 to generate crystals "s". The cooling crystallizer 130 may be a forced circulation crystallizer or an Oslo crystallizer. The introduced secondary concentrate c2 is cooled to a temperature range of −10 to 7° C. by the cooling crystallizer 130 to generate crystals and grow to a size of 100 to 200 μm.

The dehydrator 140 dehydrates the product of the cooling crystallizer 130 to separate the crystals "s" from the product of the cooling crystallizer 130. When the crystals "s" are separated, filtrate "f" remains. The dehydrator 140 may be a basket type centrifugal separator or a decanter type centrifugal separator, but the type of the dehydrator 140 is not limited thereto.

The cooling system 150 is used to cool the secondary concentrate c2 introduced into the cooling crystallizer 130. To this end, the cooling system 150 includes a compressor 151 that compresses a cooling medium "r", a condenser 152 that condenses the cooling medium "r" compressed by the compressor 151, an expansion valve 53 to expand the condensed cooling medium "r", and an evaporator 154 that cools the surrounding by evaporating the cooling medium "r" passing through the expansion valve 153.

The filtrate "f" separated by the dehydrator 140 passes through a filtration tank 141 and then returns to the evaporation crystallizer 120 through heat exchange with the cooling medium "r" of the cooling system 150. In this way, the filtrate "f" is recovered.

In detail, the low-temperature filtrate "f" discharged from the dehydrator 140 is supplied to the condenser 152 in which the low-temperature filtrate "f" exchanges heat with the cooling medium "r". The resulting high-temperature filtrate is recovered by the evaporation crystallizer 120.

As described above, because the cooling medium "r" supplied to the condenser 152 is condensed with the filtrate "f", the overall energy consumption can be reduced and the overall system configuration can be simplified. In addition, the ZLD wastewater treatment apparatus 100 can minimize waste heat because the ZLD wastewater treatment apparatus 100 does not require a cooling tower and does not use the cooling tower, thereby reducing capital expenditures and operating expenses through the process simplification.

Figure 3:
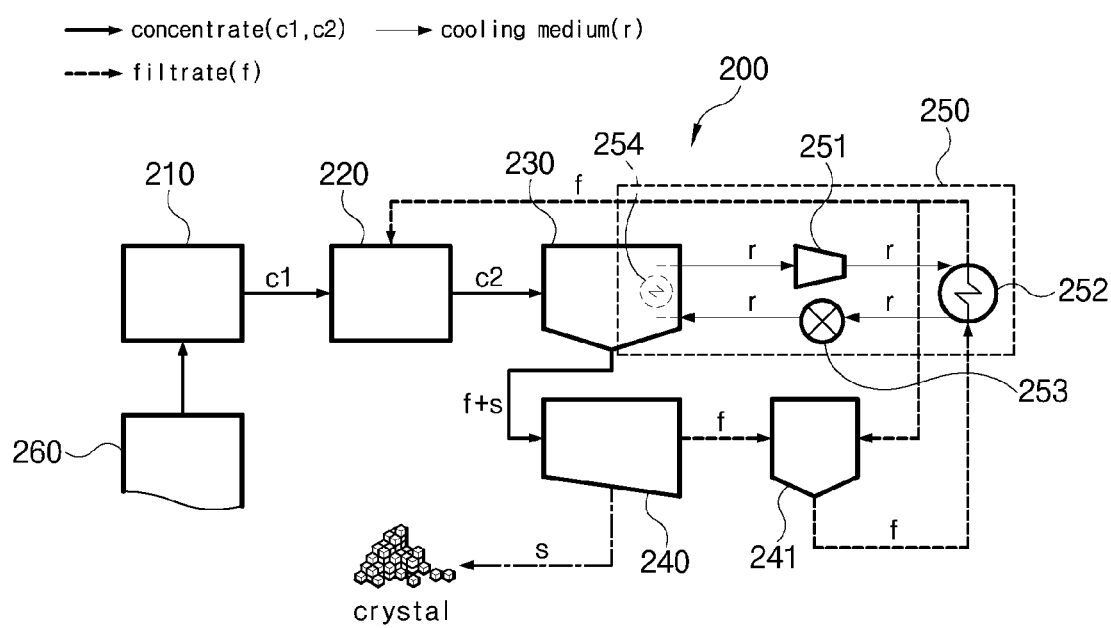
FIG. 3 is a system configuration diagram schematically illustrating a ZLD wastewater treatment apparatus according to another exemplary embodiment.

FIG. 3 is a system configuration diagram schematically illustrating a ZLD wastewater treatment apparatus 200 according to another exemplary embodiment.

Referring to FIG. 3, the ZLD wastewater treatment apparatus 200 includes a concentrator 210, an evaporation crystallizer 220, a cooling crystallizer 230, a dehydrator 240, a cooling system 250, and a pretreatment device 260.

Here, the concentrator 210, the evaporation crystallizer 220, the cooling crystallizer 230, the dehydrator 240, and the cooling system 250 of the ZLD wastewater treatment apparatus 200 are the same as the concentrator 110, the evaporation crystallizer 120, the cooling crystallizer 130, the dehydrator 140, and the cooling system 150 of the ZLD wastewater treatment apparatus 100 illustrated in FIG. 2, respectively, and a detailed description thereof will be omitted.

Because the wastewater is preferably pretreated before being concentrated by the concentrator 210, the pretreatment device 260 for pretreating the wastewater flowing into the concentrator 210 is installed at a preceding stage to the concentrator 210.

In the pretreatment process performed by the pretreatment device 260, suspended solids (SS) are removed through physicochemical actions such as coagulation, precipitation, and filtration by adding a chemical to the wastewater, and highly soluble ions, such as magnesium (Mg), which are not easily precipitated through evaporation are treated with a softening process.

Here, the softening process is a typical process for removing highly soluble ions such as magnesium, sodium, calcium, chlorine, and sulfuric acid by adding chemicals such as calcium hydroxide $(Ca(OH)_2)$, sodium hydroxide (NaOH), and sodium carbonate $(Na_2CO_3)$.

Figure 5:
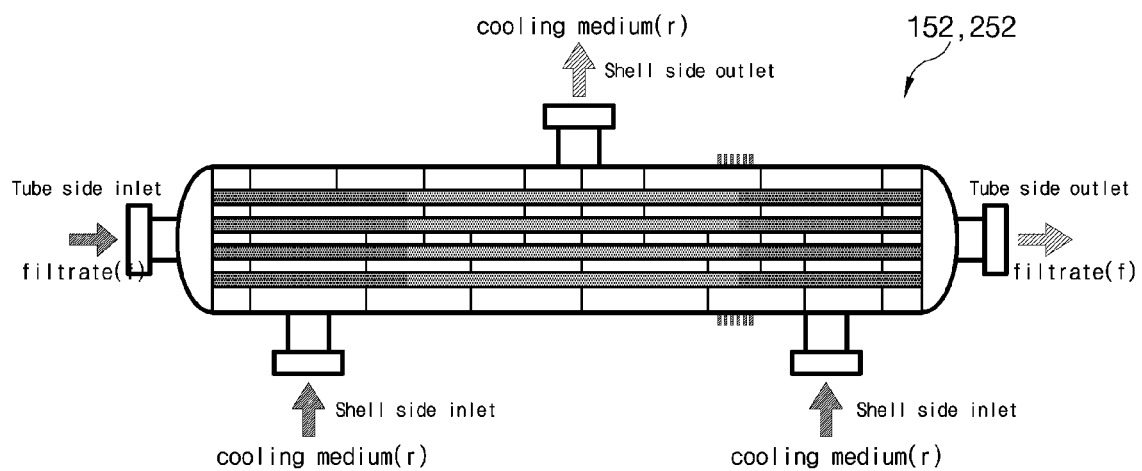
FIG. 5 is a cross-sectional view illustrating a shell tube-type heat exchanger serving as a condenser used in the ZLD wastewater treatment apparatus illustrated in FIGS. 2 and 3.

FIG. 5 is a cross-sectional view illustrating a shell tube-type heat exchanger serving as a condenser used in the ZLD wastewater treatment apparatus 100 and 200 illustrated in FIGS. 2 and 3. Referring to FIG. 5, each of the condensers 152 and 252 may be implemented as a shell-and-tube heat exchanger. In this case, the shell and the tube are arranged such that the low-temperature filtrate "f" and the cooling medium "r" perform heat exchange with each other while flowing toward the tube and flowing toward the shell, respectively.

Therefore, it is possible to solve the problem that scale occurs due to concentrate or filtrate flowing at the shell side in the related art.

As described above, the ZLD wastewater treatment apparatus according to one or more exemplary embodiments precipitates ions dissolved in wastewater as crystals (i.e., solid component) and recovers filtrate (i.e., liquid component) separated from the wastewater so that they are not discharged to the outside. Here, the low-temperature filtrate is used for condensation of a cooling medium, reducing overall energy consumption and simplifying the overall system configuration. Also, the ZLD wastewater treatment apparatus does not require a cooling tower, thereby reducing the influence of the temperature of external air and waste of heat sources, resulting in reduction in capital expenditures and operating expenses.

Hereinafter, a wastewater treatment method using the ZLD wastewater treatment apparatus 100 or 200 will be described.

Figure 4:
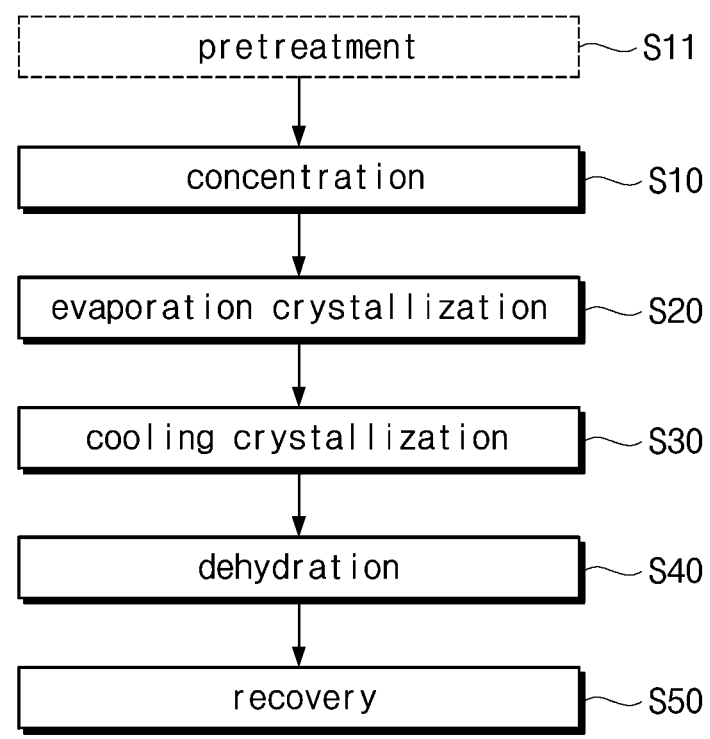
FIG. 4 is a flowchart illustrating a ZLD wastewater treatment method according to an exemplary embodiment using the ZLD wastewater treatment apparatus illustrated in FIGS. 2 and 3.

FIG. 4 is a flowchart illustrating a ZLD wastewater treatment method according to an exemplary embodiment using the ZLD wastewater treatment apparatus illustrated in FIGS. 2 and 3.

Referring to FIGS. 2 through 4, wastewater is concentrated to primary concentrate c1 (operation S10). The concentration of the wastewater is performed by the evaporative concentrator 110 or 210, and the produced primary concentrate c1 has a concentration of 120,000 to 160,000 mg/L.

If necessary, prior to the concentration (operation S10), the wastewater may be pretreated (operation S11). In the pretreatment process, suspended solids contained in the introduced wastewater are removed through physicochemical coagulation and precipitation, and highly soluble ions, such as magnesium, which are difficult to precipitate through evaporation are removed by a softening process.

The primary concentrate c1 produced through the concentration is evaporated to further concentrate the primary concentrate c1 and crystal nuclei are formed (operation S20). For the evaporation concentration, a forced circulation evaporator may be used. Through this operation S20, the primary concentrate c1 is concentrated to secondary concentrate c2 having a concentration of 300,000 to 400,000 mg/L.

The secondary concentrate c2 produced through the evaporation crystallization is cooled so that crystal nuclei grow into crystals (operation S30). For this cooling crystallization, a forced circulation crystallizer or an Oslo crystallizer may be used. The secondary concentrate c2 is cooled to a temperature range of −10 to 7° C.

If the cooling crystallization of the secondary concentrate c2 is performed with the cooling crystallizer 130 or 230, the product is separated into crystals "s" (i.e., solid component) and filtrate "f" (i.e., liquid component) operation S40). For this separation, the dehydrator 140 or 240 may be used. For example, a vertical centrifuge may be used as the dehydrator 140 or 240.

The filtrate "f" discharged from the dehydrator 140 or 240 is recovered and returned to the evaporation crystallizer 120 or 220 (operation S50). For example, the low-temperature filtrate "f" discharged from the dehydrator 140 or 240 is supplied to the condenser 152 or 252 in which the low-temperature filtrate "f" exchanges heat with the cooling medium "r". The resulting high-temperature filtrate "f" is recovered by the evaporation crystallizer 120 or 220.

As described above, in the ZLD wastewater treatment method according to the exemplary embodiment, the cooling medium "r" supplied to the condenser 152 or 252 of the cooling system 150 or 250 is condensed using the low-temperature filtrate "f". Therefore, the overall energy consumption is reduced, and the system configuration is simplified.

In addition, in the ZLD wastewater treatment method according to the exemplary embodiment, because a cooling tower is not used, waste heat that is discarded without use is minimized. Further, because the process is simplified, capital expenditures and operating expenses are reduced.

While one or more exemplary embodiments have been described with reference to the accompanying drawings, it is to be understood by those skilled in the art that various modifications and changes in form and details may be made therein without departing from the spirit and scope as defined by the appended claims. Accordingly, the description of the exemplary embodiments should be construed in a descriptive sense only and not to limit the scope of the claims, and many alternatives, modifications, and variations will be apparent to those skilled in the art.

What is claimed is:

1. A zero-liquid discharge (ZLD) wastewater treatment apparatus comprising:
 a concentrator configured to concentrate wastewater to produce a primary concentrate;
 an evaporation crystallizer configured to concentrate and crystallize the primary concentrate to produce a secondary concentrate;
 a cooling crystallizer configured to cool the secondary concentrate to generate crystals from the secondary concentrate;
 a dehydrator configured to separate the crystals produced by the cooling crystallizer into a solid component and a liquid component; and
 a cooling system configured to cool the secondary concentrate introduced into the cooling crystallizer,
 wherein the liquid component produced by the dehydrator heat exchanges with a cooling medium in the cooling system and returns to the evaporation crystallizer,
 wherein the cooling system comprises a compressor configured to compress the cooling medium, a condenser configured to condense the compressed cooling medium produced by the compressor, an expansion valve configured to expand the condensed cooling medium, and an evaporator configured to evaporate the cooling medium passing through the expansion valve to cool surrounding air, and
 wherein the liquid component produced by the dehydrator is supplied to the condenser to heat exchange with the cooling medium in the condenser and condense the cooling medium.

2. The apparatus according to claim 1, wherein the condenser is a shell-and-tube heat exchanger, and
 wherein the liquid component produced by the dehydrator flows to a tube and the cooling medium flows to a shell so that the liquid component and the cooling medium perform heat exchange with each other.

3. The apparatus according to claim 1, wherein the primary concentrate introduced into the evaporation crystallizer is concentrated through a vacuum concentration at a temperature of 65 to 75° C. and a pressure of 0.2 to 0.3 barg.

4. The apparatus according to claim 1, wherein the secondary concentrate introduced into the cooling crystallizer is cooled to a temperature range of −10 to 7° C.

5. The apparatus according to claim 1, wherein the dehydrator is a basket-type centrifuge or decanter-type centrifuge.

6. The apparatus according to claim 1, further comprising a filtration tank wherein the liquid component produced by the dehydrator is supplied to the condenser through the filtration tank,
 wherein a first portion of the liquid component heated by heat exchange with the cooling medium at the condenser is produced to the evaporation crystallizer and a second portion of the liquid component heated by heat exchange with the cooling medium at the condenser is produced to the filtration tank.

7. A zero liquid discharge (ZLD) wastewater treatment apparatus comprising:
 a concentrator configured to concentrate wastewater to produce a primary concentrate;
 an evaporation crystallizer configured to concentrate and crystallize the primary concentrate to produce a secondary concentrate;
 a cooling crystallizer configured to cool the secondary concentrate to generate crystals from the secondary concentrate;

a dehydrator configured to separate the crystals produced by the cooling crystallizer into a solid component and a liquid component;

a cooling system configured to cool the secondary concentrate introduced into the cooling crystallizer; and a pretreatment device configured to pretreat the wastewater supplied to the concentrator, wherein the liquid component produced by the dehydrator heat exchanges with a cooling medium in the cooling system and returns to the evaporation crystallizer, wherein the cooling system comprises a compressor configured to compress the cooling medium, a condenser configured to condense the compressed cooling medium produced by the compressor, an expansion valve configured to expand the condensed cooling medium, and an evaporator configured to evaporate the cooling medium passing through the expansion valve to cool surrounding air, and wherein the liquid component produced by the dehydrator is supplied to the condenser to heat exchange with the cooling medium in the condenser and condense the cooling medium.

8. The apparatus according to claim 7, wherein the pretreatment device removes suspended solids contained in the wastewater using physicochemical actions including at least one of coagulation and precipitation, and removes highly soluble ions, that are difficult to precipitate through evaporation, using a softening process.

9. The apparatus according to claim 7, wherein the condenser is a shell-and-tube heat exchanger, and the liquid component produced by the dehydrator flows to a tube and the cooling medium flows to a shell so that the liquid component and the cooling medium perform heat exchange with each other.

* * * * *